US011675637B2

(12) United States Patent
Malhotra et al.

(10) Patent No.: US 11,675,637 B2
(45) Date of Patent: *Jun. 13, 2023

(54) HOST ROUTED OVERLAY WITH DETERMINISTIC HOST LEARNING AND LOCALIZED INTEGRATED ROUTING AND BRIDGING

(71) Applicant: Arrcus Inc., San Jose, CA (US)

(72) Inventors: Neeraj Malhotra, Los Gatos, CA (US); Keyur Patel, San Jose, CA (US); Randy Bush, San Jose, CA (US); Csaba Keszei, San Jose, CA (US); Robert Austein, Reading, MA (US); Harsha Vardhan Kovuru, Cupertino, CA (US)

(73) Assignee: Arrcus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,890

(22) Filed: Nov. 16, 2021

(65) Prior Publication Data

US 2022/0075672 A1 Mar. 10, 2022

Related U.S. Application Data

(63) Continuation of application No. 16/549,731, filed on Aug. 23, 2019, now Pat. No. 11,206,208.

(Continued)

(51) Int. Cl.
*G06F 9/54* (2006.01)
*H04L 45/00* (2022.01)
(Continued)

(52) U.S. Cl.
CPC .......... *G06F 9/542* (2013.01); *G06F 9/45558* (2013.01); *G06F 9/4881* (2013.01);
(Continued)

(58) Field of Classification Search
CPC ..... H04L 45/22; H04L 12/2881; H04L 12/44; H04L 12/462; H04L 12/4633;
(Continued)

(56) References Cited

U.S. PATENT DOCUMENTS 5,873,076 A 2/1999 Barr
6,970,561 B1 11/2005 Obana
(Continued)

FOREIGN PATENT DOCUMENTS

EP 3070877 9/2016
WO WO2015070236 5/2015

OTHER PUBLICATIONS

Samman et al. "Multicash parallel pipeline router architecture for network-on-chip." In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_Glesner/publication/221340626_Multicast_Parallel_Pipeline_Router_Architecture_for_Network-on-Chip/links/02bfe50de0dc34c390000000/Multicast-Parallel-Pipeline-Router-Architecture-for-Network-on-Chip.pdf> entire document.

(Continued)

*Primary Examiner* — Rushil Parimal Sampat
(74) *Attorney, Agent, or Firm* — David R. Stevens; Stevens Law Group

(57) ABSTRACT

Systems, methods, and devices for improved routing operations in a network computing environment. A system includes a virtual customer edge router and a host routed overlay comprising a plurality of host virtual machines. The system includes a routed uplink from the virtual customer edge router to one or more of the plurality of leaf nodes. The system is such that the virtual customer edge router is configured to provide localized integrated routing and bridging (TRB) service for the plurality of host virtual machines of the host routed overlay.

18 Claims, 13 Drawing Sheets

Host Routed Overlay

Related U.S. Application Data

(60) Provisional application No. 62/722,003, filed on Aug. 23, 2018.

(51) Int. Cl.

| | | |
|---|---|---|
| H04L 45/50 | (2022.01) | |
| H04L 12/44 | (2006.01) | |
| H04L 12/46 | (2006.01) | |
| H04L 45/48 | (2022.01) | |
| G06F 16/27 | (2019.01) | |
| G06F 16/23 | (2019.01) | |
| G06F 16/22 | (2019.01) | |
| G06F 9/455 | (2018.01) | |
| H04L 12/66 | (2006.01) | |
| H04L 45/02 | (2022.01) | |
| G06F 9/48 | (2006.01) | |
| H04L 45/28 | (2022.01) | |
| H04L 45/24 | (2022.01) | |
| H04L 45/745 | (2022.01) | |
| H04L 47/125 | (2022.01) | |
| H04L 9/40 | (2022.01) | |
| H04L 12/28 | (2006.01) | |
| H04L 45/586 | (2022.01) | |
| H04L 67/1097 | (2022.01) | |
| H04L 67/55 | (2022.01) | |
| H04L 49/25 | (2022.01) | |

(52) U.S. Cl.
CPC ............ *G06F 9/54* (2013.01); *G06F 16/2272* (2019.01); *G06F 16/2379* (2019.01); *G06F 16/27* (2019.01); *G06F 16/278* (2019.01); *H04L 12/2881* (2013.01); *H04L 12/44* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/22* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/55* (2022.05); *G06F 2009/45595* (2013.01); *H04L 49/25* (2013.01); *H04L 2012/4629* (2013.01)

(58) Field of Classification Search
CPC ...... H04L 12/4641; H04L 12/66; H04L 45/02; H04L 45/24; H04L 45/26; H04L 45/28; H04L 45/48; H04L 45/50; H04L 45/586; H04L 45/66; H04L 45/745; H04L 47/125; H04L 63/0272; H04L 67/1097; H04L 67/26; H04L 49/25; H04L 2012/4629; H04L 43/0852; H04L 41/12; H04L 43/028; H04L 43/106; H04L 49/254; H04L 49/356; H04L 49/70; H04L 69/22; H04L 67/16; H04L 67/2842; G06F 16/27; G06F 16/2379; G06F 16/2272; G06F 16/278; G06F 9/45558; G06F 9/4881; G06F 2009/45595

See application file for complete search history.

(56) References Cited

U.S. PATENT DOCUMENTS

| | | |
|---|---|---|
| 7,274,869 B1 | 9/2007 | Pan |
| 7,593,320 B1 | 9/2009 | Cohen |
| 7,945,813 B1 | 5/2011 | Watson |
| 7,970,918 B2 | 6/2011 | Thompson |
| 8,060,533 B1 | 11/2011 | Wheeler |
| 8,756,656 B1 | 6/2014 | Hartmann |
| 8,849,955 B2 | 9/2014 | Prahlad |
| 9,288,101 B1 | 3/2016 | Dalal |
| 9,331,940 B2 | 5/2016 | Balus |
| 9,544,185 B1 | 1/2017 | Yadav et al. |
| 10,200,274 B1 | 2/2019 | Suryanarayana |
| 10,530,873 B1 | 1/2020 | Arya |
| 2003/0012133 A1 | 1/2003 | Jappinen |
| 2004/0003064 A1 | 1/2004 | Astley |
| 2004/0264460 A1 | 12/2004 | Yoshimoto |
| 2005/0021622 A1 | 1/2005 | Cullen |
| 2006/0136256 A1 | 6/2006 | Roots |
| 2006/0233322 A1 | 10/2006 | Allman |
| 2007/0074150 A1 | 3/2007 | Jolfael |
| 2007/0104192 A1 | 5/2007 | Yoon |
| 2007/0291773 A1 | 12/2007 | Khan |
| 2010/0061366 A1 | 3/2010 | DelRegno |
| 2010/0189117 A1 | 7/2010 | Gowda |
| 2010/0211781 A1 | 8/2010 | Auradkar |
| 2010/0250867 A1 | 9/2010 | Bettger |
| 2010/0293235 A1 | 11/2010 | Cadoret |
| 2011/0004913 A1 | 1/2011 | Nagarajan |
| 2012/0281700 A1 | 11/2012 | Koganti |
| 2012/0300782 A1 | 11/2012 | Farinacci |
| 2013/0188521 A1 | 7/2013 | Jain |
| 2013/0329584 A1 | 12/2013 | Ghose |
| 2013/0336164 A1 | 12/2013 | Yang et al. |
| 2014/0044126 A1 | 2/2014 | Sabhanatarajan |
| 2014/0112122 A1 | 4/2014 | Kapadia |
| 2014/0207991 A1 | 7/2014 | Kaushik |
| 2014/0233399 A1 | 8/2014 | Mann |
| 2014/0317616 A1 | 10/2014 | Chu |
| 2014/0366037 A1 | 12/2014 | Berretta |
| 2014/0372748 A1 | 12/2014 | Dixon |
| 2015/0010002 A1 | 1/2015 | Duda |
| 2015/0188753 A1 | 7/2015 | Anumala et al. |
| 2015/0199415 A1 | 7/2015 | Bourbonnais |
| 2015/0312134 A1 | 10/2015 | Kapadia |
| 2015/0355946 A1 | 12/2015 | Kang |
| 2016/0014025 A1 | 1/2016 | Wang |
| 2016/0112821 A1 | 4/2016 | Raleigh |
| 2016/0142313 A1 | 5/2016 | Devireddy |
| 2016/0196320 A1 | 7/2016 | Borowiec |
| 2016/0294608 A1 | 10/2016 | Biswal |
| 2016/0337231 A1 | 11/2016 | Dixon |
| 2016/0352619 A1 | 12/2016 | Gattani |
| 2016/0357778 A1 | 12/2016 | MacKenzie |
| 2017/0032011 A1 | 2/2017 | Song |
| 2017/0041239 A1 | 2/2017 | Goldenberg |
| 2017/0155542 A1 | 6/2017 | Fang |
| 2017/0171057 A1 | 6/2017 | Dong et al. |
| 2017/0310548 A1 | 10/2017 | Jailani |
| 2017/0331669 A1 | 11/2017 | Ganesh |
| 2018/0034665 A1 | 2/2018 | Nguyen |
| 2018/0048591 A1 | 2/2018 | Sellappa et al. |
| 2018/0062914 A1 | 3/2018 | Boutros |
| 2018/0062993 A1 | 3/2018 | Wu |
| 2018/0121433 A1 | 5/2018 | Nevrekar |
| 2018/0167475 A1 | 6/2018 | Agarwal |
| 2018/0167476 A1 | 6/2018 | Hoffner |
| 2018/0021995 A1 | 8/2018 | Arra et al. |
| 2018/0220283 A1 | 8/2018 | Condeixa |
| 2019/0073419 A1 | 3/2019 | Dong |
| 2019/0089575 A1 | 3/2019 | Pundir |
| 2019/0104438 A1 | 4/2019 | Mittal |
| 2019/0124013 A1 | 4/2019 | Murugesan |
| 2019/0141112 A1 | 5/2019 | Kalathur |
| 2019/0149361 A1 | 5/2019 | Sarwar |
| 2019/0155741 A1 | 5/2019 | Linke |
| 2019/0207844 A1 | 7/2019 | Kodavanty |
| 2019/0260670 A1 | 8/2019 | Kulkarni |
| 2019/0327166 A1 | 10/2019 | Thubert |
| 2019/0342389 A1 | 11/2019 | Bono |
| 2019/0349426 A1 | 11/2019 | Smith |
| 2019/0349733 A1 | 11/2019 | Nolan |
| 2019/0363975 A1 | 11/2019 | Djernaes |

(56) References Cited

U.S. PATENT DOCUMENTS

2020/0036787 A1   1/2020  Gupta
2020/0084103 A1*  3/2020  Miller .................... H04L 45/02
2021/0075630 A1   3/2021  Immidi

OTHER PUBLICATIONS

Wu et al. A new multi-channel MAC protocol with on-demand channel assignment for multi-hop mobile ad hoc networks. Dec. 9, 2000 (Dec. 9, 2000) Retrieved on Oct. 13, 2019 (Oct. 13, 2019) from <http://citeseerx.ist.psu.edu/viewdoc/download?doi=10.1.1.457.5412&rep=rep1&type=pdf> entire document.

"Saurav Haloi: ""Introduction to Apache ZooKeeper""", Internet Citation, Feb. 5, 2015 (Feb. 5, 2015), XP002806551, Retrieved from the Internet: URL:https://hub.packtpub.com/introduction-apache-zookeeper/ [retrieved on May 18, 2022] * chapter ""The ZooKeeper Watches""*".

Sajassi et al, BGP MPLS-Based Ethernet VPN, Feb. 2015 (Year: 2015).

Juniper, Understanding EVPN Pure Route Type-5 on QFX Series Switches, Jul. 2017 (Year: 2017).

* cited by examiner

Centralized Gateway (Prior Art)

Distributed Anycast Gateway (Prior Art)

Host Routed Overlay

Host Learning At Boot Up

Local Forwarding State

Remote Forwarding State

Server Local Flow – Intra-Subnet

Server Local Flow – Inter-Subnet

Overlay Flow – Intra-Subnet – 12.1.1.4 → 12.1.1.2

Overlay Flow – Inter-Subnet – 12.1.1.4 → 10.1.1.2

Server Link Failure

HOST ROUTED OVERLAY WITH DETERMINISTIC HOST LEARNING AND LOCALIZED INTEGRATED ROUTING AND BRIDGING

CROSS-REFERENCE TO RELATED APPLICATIONS

This application is a continuation of U.S. patent application Ser. No. 16/549,731 filed Aug. 23, 2019, now issued as U.S. Pat. No. 11,206,208 B2 titled "Host Routed Overlay With Deterministic Host Learning And Localized Integrated Routing And Bridging," which claims priority to U.S. Provisional Patent Application Ser. No. 62/722,003 filed Aug. 23, 2018 titled "Database Systems Methods And Devices," both of which are incorporated herein by reference in their entirety, including but not limited to those portions that specifically appear hereinafter, the incorporation by reference being made with the following exception: In the event that any portion of the above-referenced applications is inconsistent with this application, this application supersedes the above-referenced applications.

TECHNICAL FIELD

The disclosure relates to computing networks and particularly relates to network routing protocols.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

One network architecture is a multi-tenant datacenter. The multi-tenant datacenter defines an end-end system suitable for service deployment in a public or private cloud-based model. The multi-tenant datacenter may include a wide area network, multiple provider datacenters, and tenant resources. The multi-tenant datacenter may include a multi-layer hierarchical network model. The multi-layer hierarchy may include a core layer, an aggregation layer, and an access layer. The multiple layers may include a layer-2 overlay and a layer-3 overlay with an L2/L3 boundary.

One datacenter overlay routing architecture is the centralized gateway architecture. Another datacenter overlay routing architecture is the distributed anycast gateway architecture. These architectures have numerous drawbacks as will be discussed further herein. In light of the foregoing, disclosed herein are systems, methods, and devices for improved routing architectures.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
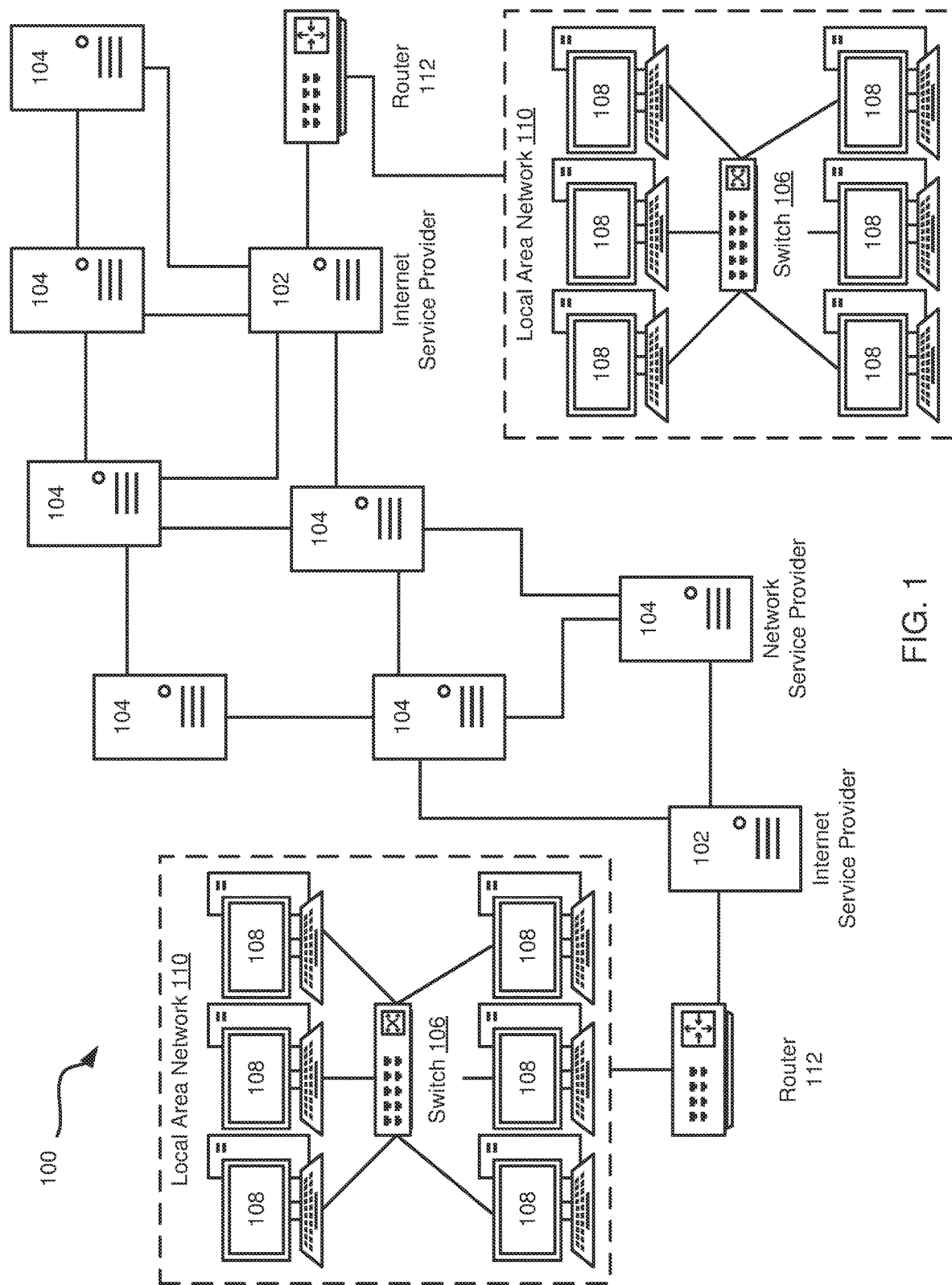
FIG. 1 is a schematic diagram of a system of networked devices communicating over the Internet.

Disclosed herein are systems, methods, and devices for a routed overlay solution for Internet Protocol (IP) subnet stretch using localized integrated routing and bridging (RB) on host machines. The systems, methods, and devices disclosed herein provide a virtual first hop gateway on a virtual customer edge (CE) router on a bare metal server. The virtual CE router provides localized East-West integrated routing and bridging (RB) service for local hosts. In an embodiment, a default routed equal-cost multipath (ECMP) uplinks from the virtual CE router to leaf nodes for North-South and East-West connectivity.

The systems, methods, and devices disclosed herein enable numerous networking benefits. The system does not require address resolution protocol (ARP)-based learning of routes and enables deterministic host learning. The improved systems discussed herein eliminate age-outs, probes, and syncs, and do not require media access control (MAC) entries on leaf node. The improved systems additionally eliminate complex multi-chassis link aggregation (MLAG) bridging functions at the leaf node. Additionally, the virtual CE router as discussed herein stores local Internet protocol (IP) and media access control (MAC) addresses along with the default ECMP route to the leaf nodes. Further, the improved systems discussed herein provide host routing at the leaf node for stretched subnets and enable host mobility.

In an Ethernet virtual private network (EVPN)-enabled multiple tenant data center overlay, an architecture with distributed anycast layer-3 (L3) gateway on the leaf nodes provides first hop gateway function for workloads. This pushes a service layer L2-L3 boundary (layer-2 to layer-3 boundary) down to the leaf node. In other words, all inter-subnet virtual private network (VPN) traffic from workload host virtual machines is routed on the leaf nodes. Virtual machine mobility and flexible workload placement is achieved by stretching the layer-2 overlay across the routed network fabric. Intra-subnet traffic across the stretched layer-2 domain is overlay bridged on the leaf node. The leaf node provides an EVPN-IRB service for directly connected host virtual machines. This routes all overlay inter-subnet VPN traffic and bridges all overlay intra-subnet VPN traffic across a routed fabric underlay.

The embodiments discussed herein eliminate the need for overlay bridging functions to be supported on the leaf nodes. Additionally, the embodiments discussed herein eliminate the need for layer-2 MLAG connectivity and related complex procedures between the leaf nodes and hosts. Further, the embodiments discussed herein eliminate the need for data plane and ARP-based host learning on the leaf nodes. These benefits are enabled by the embodiments disclosed herein while providing IP unicast inter-subnet and intra-subnet VPN connectivity, virtual machine mobility, and flexible workload placement across stretched IP subnets.

The embodiments of the disclosure separate local layer-2 switching and IRB functions from the leaf node and localize them into a small virtual CE router on the bare metal server. This is achieved by running a small virtual router VM on the bare metal server that now acts as the first hop gateway for host virtual machines and provides local IRB switching across virtual machines local to the bare metal server. This virtual router acts as a traditional CE router that may be multi-homed to multiple leaf nodes via a layer-3 routed interface on the leaf node. leaf nodes in the fabric function as pure layer-3 VPN PE routers that are free of any layer-2 bridging or IRB function. To allow for flexible placement and mobility of layer-3 endpoints across the DC overlay, while providing optimal routing, traffic can be host routed on the leaf nodes versus being subnet routed. This is also the case with EVPN-IRB.

The improved routing architectures discussed herein (see FIGS. 4-10) can provide the benefit of a completely routed network fabric. However, the EVPN overlay must still provide both routing and bridging functions on the leaf nodes. Connectivity from leaf nodes to hosts is achieved via layer-2 ports and leaf nodes must provide local layer-2 switching. leaf nodes must support proprietary MLAG or EVPN-LAG functions to multi-home hosts across two or more leaf nodes. Further, ARP requests must initially be flooded across the overlay to bootstrap host learning.

Multi-chassis link aggregation (MLAG) and ethernet virtual private network link aggregation (EVPN-LAG) based multi-homing result in a need for complex layer-2 functions to be supported on the leaf nodes. Host MACs must still be learnt in data-plane on either of the leaf nodes and synced across all redundant leaf nodes. Host ARP bindings must still be learnt via ARP flooding on either of the leaf nodes and synced across all redundant leaf nodes. Further, a physical loop resulting from MLAG topology must be prevented for broadcast, unknown-unicast (BUM) traffic via split horizon filtering mechanism across redundant leaf nodes. Further, a designated forwarder election mechanism must be supported on the leaf nodes to prevent duplicate BUM packets being forwarded to multi-homed hosts. While EVPN procedures have been specified for each of the above, overall implementation and operational complexity of an EVPN-IRB based solution may not be desirable for all use cases.

For purposes of furthering understanding of the disclosure, some explanation will be provided for numerous networking computing devices and protocols.

In a computer network environment, a networking device such as a switch or router may be used to transmit information from one destination to a final destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located very far from the person's computer. It is very likely that there is no direct communication between the router at the person's home and the remote server. Therefore, the data package and the message must travel by "hopping" to different networking devices until reaching the final destination at the remote server. The router at the person's home must determine a route for transmitting the data package and the message thru multiple different devices connected to the Internet until the data package and the message reach the final destination at the remote server.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are located in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 is presented as background information for illustrating certain concepts discussed herein. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
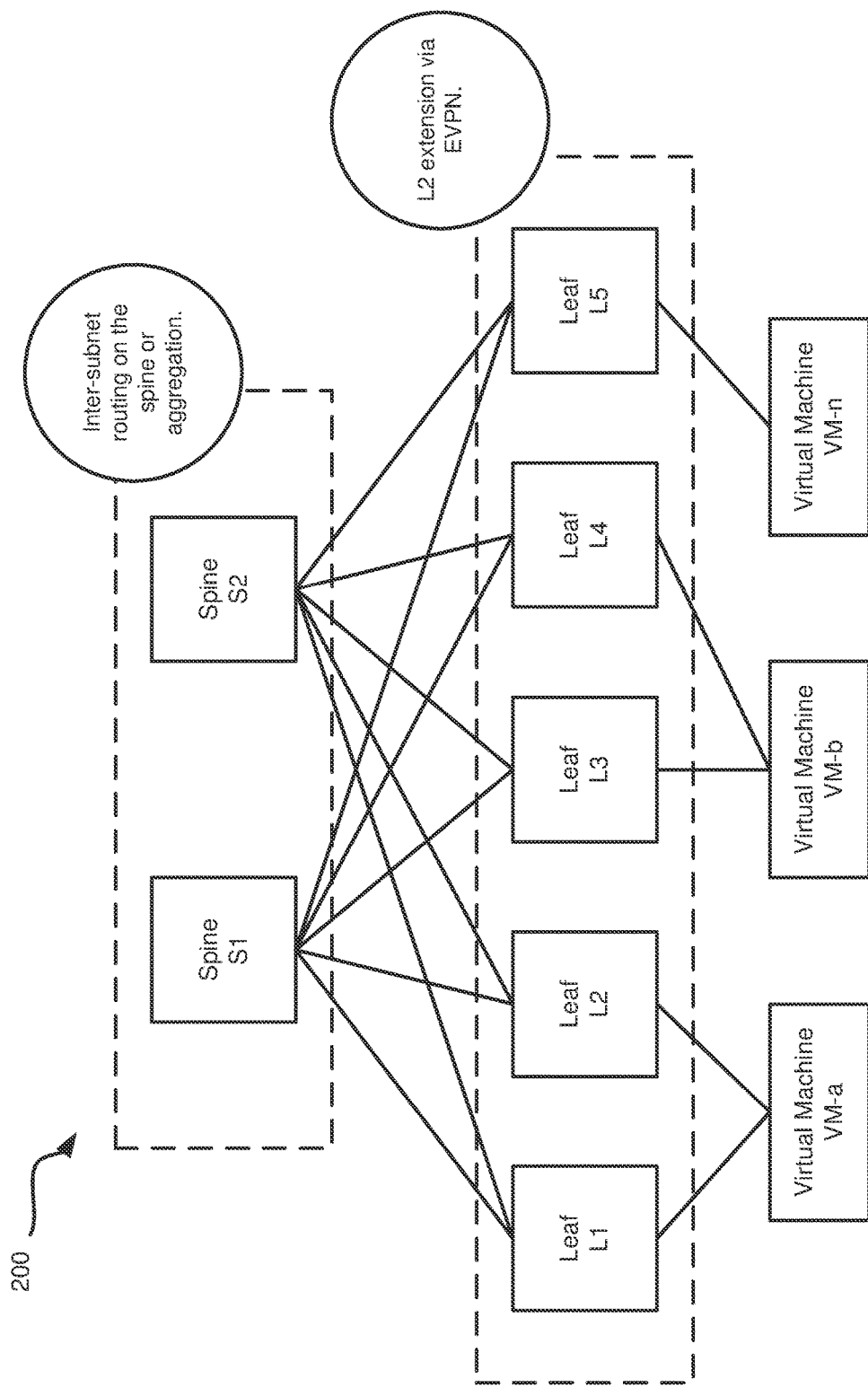
FIG. 2 is a schematic diagram of a leaf-spine network topology with a centralized gateway datacenter overlay routing architecture as known in the prior art.

FIG. 2 is a schematic diagram of an architecture 200 with a centralized gateway as known in the prior art. The architecture 200 includes spine nodes and leaf nodes in a leaf-spine network topology. Inter-subnet routing is performed on the spine nodes or aggregation layer. The leaf nodes are connected to multiple virtual machines. The centralized gateway architecture 200 may include a spine layer, the leaf layer, and an access layer. There may be an L2-L3 boundary at the aggregation layer and the datacenter perimeter may exist at the core layer. In the architecture illustrated in FIG. 2, the spine layer including spine S1 and spine S2 may serve as the core layer. There is a layer-2 extension via an ethernet virtual private network (EVPN) on the leaf (aggregation) layer.

There are numerous drawbacks with the centralized gateway architecture 200. There may be an L3-L3 boundary on the spine layer that causes a scale bottleneck. This further causes a single point of failure in the architecture 200. Further, there are numerous operational complexities at the leaf node in the centralized gateway architecture 200. One complexity is that the architecture 200 must deal with the unpredictable nature of MAC and ARP age-outs, probes, silent hosts, and moves. Further, the architecture 200 must be configured to flood overlay ARP and populate both IP and MAC forwarding entries for all hosts across the overlay bridge. Additionally, the architecture 200 must be configured to sync MAC addresses and ARP for MLAG and perform filtering and election for MLAG.

Figure 3:
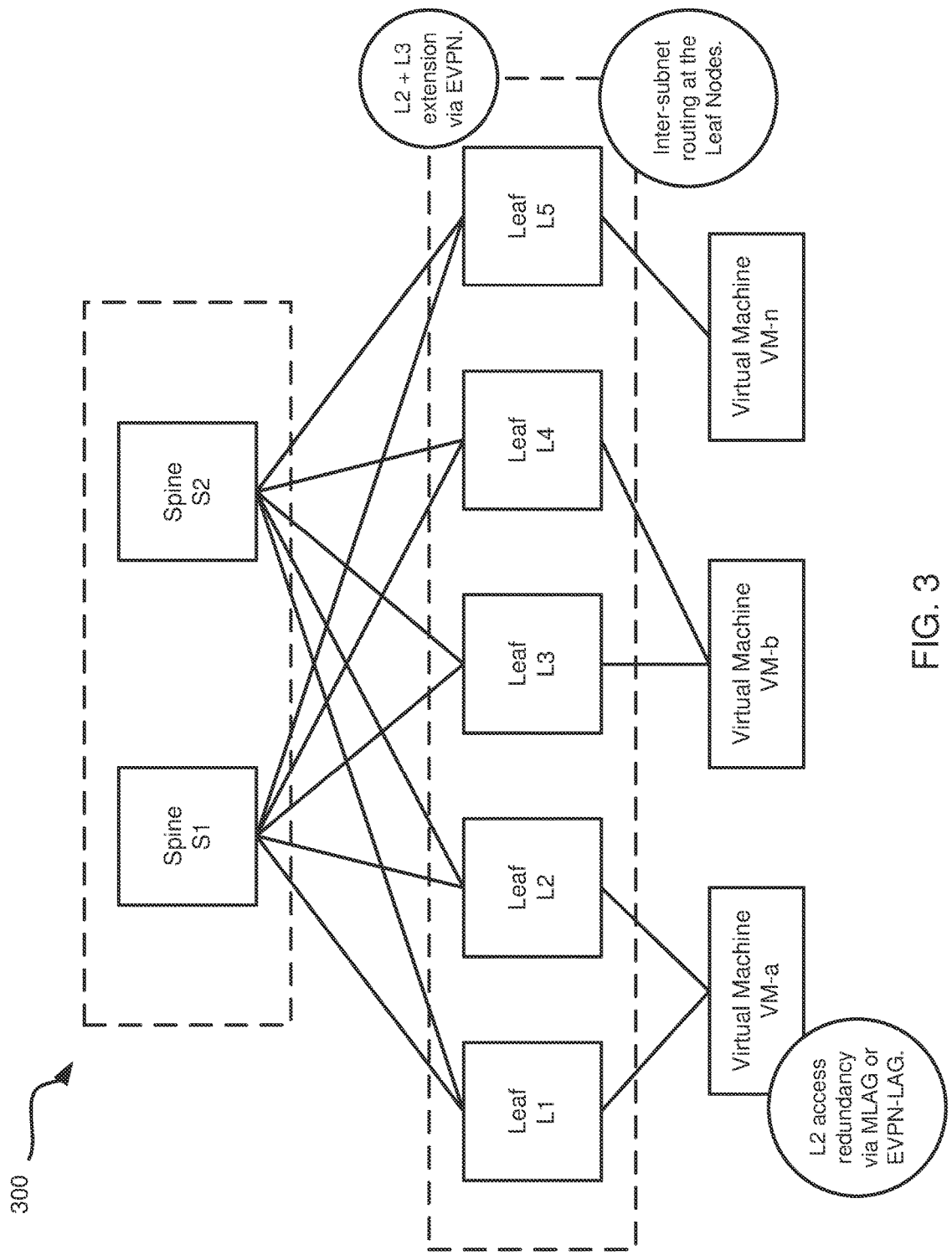
FIG. 3 is a schematic diagram of a leaf-spine network topology with a distributed anycast gateway datacenter overlay routing architecture as known in the prior art.

FIG. 3 is a schematic diagram of an architecture 300 with distributed anycast L3 gateways on distributed anycast routers as known in the prior art. The architecture 300 provides first hop gateway function for workloads. As a result, a service layer on an L2-L3 boundary is serviced by the distributed anycast router on the leaf nodes. In other words, all inter-subnet VPN information traffic from workload host virtual machines is routed at the distributed anycast routers. Virtual machine mobility and flexible workload placement is achieved via stretching the layer-2 overlay across the routed network fabric. Intra-subnet traffic across the stretched layer-2 domain is overlay bridged to the overlay bridged on the leaf nodes. The distributed anycast router may provide an EVPN-IRB service for directly connected host virtual machines, routing all overlay inter-subnet VPN traffic and bridging all overlay intra-subnet VPN traffic across a routed fabric underlay.

The architecture 300 further illustrates an exemplary architecture for providing a completely routed network fabric. However, certain drawbacks exist with the architecture 300 shown in FIG. 2. For example, the EVPN overlay must still provide both routing and bridging functions on the distributed anycast router. Further, connectivity from distributed anycast routers to hosts is achieved via layer 2 ports and leaf nodes must provide local layer-2 switching. leaf nodes must support proprietary MLAG or EVPN-LAG functions to be able to multi-home hosts across two or more distributed anycast routers. ARP requests must initially be flooded across the overlay to bootstrap host learning.

MLAG or EVPN-LAG based multi-homing in particular results in a need for complex layer-2 functions to be supported on the distributed anycast routers. For example, host MACs must still be learnt in data-plane on either of the leaf nodes and synced across all redundant distributed anycast routers. Similarly, host ARP bindings must still be learnt via ARP flooding on either of the distributed anycast routers and synced across all redundant distributed anycast routers. A physical loop resulting from MLAG topology must be prevented for BUM traffic via split horizon filtering mechanism across redundant distributed anycast routers. Further, a designated forwarder election mechanism must be supported on the distributed anycast routers to prevent duplicate BUM packets being forwarded to multi-homed hosts.

While EVPN procedures have been specified for each of the above, overall implementation and operational complexity of an EVPN-IRB based solution may not be desirable for all use cases. Accordingly, an alternate solution is provided and discussed herein. For example, the need for overlay bridging functions to be supported on the distributed anycast routers is eliminated. Similarly, this architecture eliminates the need for layer 2 MLAG connectivity and related complex procedures between the distributed anycast routers and hosts and also eliminates the need for data-plane and ARP based host learning on the distributed anycast routers while providing IP unicast inter-subnet and intra-subnet VPN connectivity, VM mobility, and flexible workload placement across stretched IP subnets.

Figure 4:
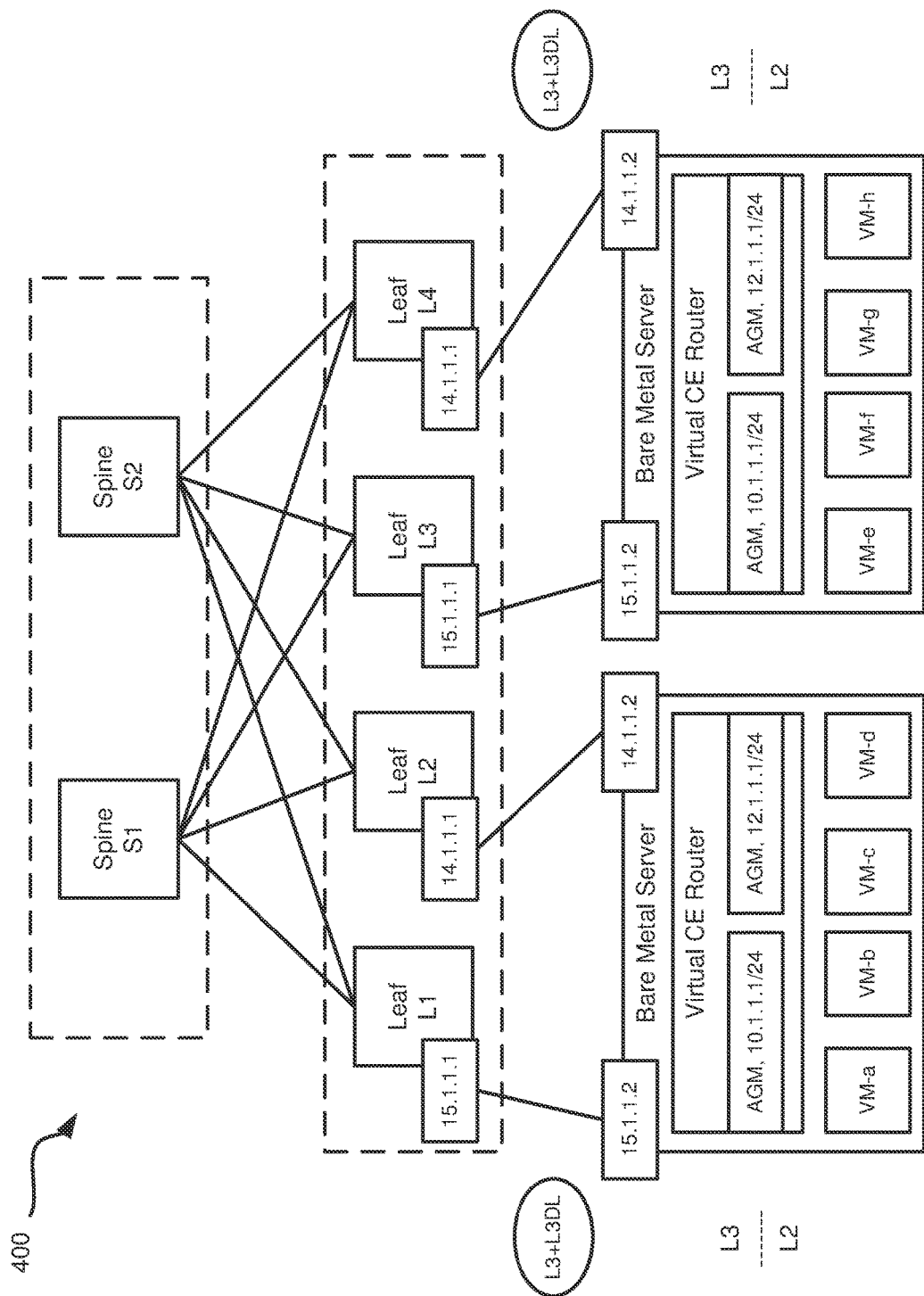
FIG. 4 is a schematic diagram of a datacenter fabric architecture with overlay routing at the L2-L3 boundary pushed to a virtual customer edge (CE) router gateway on a bare metal server.

FIG. 4 is a schematic diagram of an architecture 400 for host routed overlay with deterministic host learning and localized integrated routing and bridging on host machines. The architecture 400 includes virtual customer edge (CE) routers with leaf node links that serve as layer-3 interfaces. There are no layer-2 PE-CE. The leaf node layer-3 subnet addresses on the virtual CE routers are locally scoped and never redistributed in Border Gateway Protocol (BGP) routing. As shown, the virtual CE routers are located on a bare metal server and are in communication with one or more virtual machines that are also located on the bare metal server. In an embodiment, a virtual CE router and one or more virtual machines are located on the same physical bare metal server. The virtual CE router is in communication with the one or more virtual machines located on the same bare metal server. The virtual CE router is in communication with one or more leaf nodes in a leaf-spine network topology. Each leaf node in communication with the virtual CE router has a dedicated communication line to the virtual CE router as illustrated in FIGS. 4-10. The layer-2-layer-3 boundary (L2/L3 boundary) exists at the virtual CE router.

In the example illustrated in FIG. 4, there is one virtual CE router on each of the two bare metal servers. The bare metal server further includes a plurality of virtual machines. The one virtual CE router has two subnets, including Anycast gateway MAC (AGM) 10.1.1.1/24 and 12.1.1.1/24. The anycast gateway MAC (AGM) boxes are internal to the virtual CE router. The interfaces between the virtual CE router and the one or more virtual machines on the bare metal server may be created in Linux hypervisor. The virtual CE router includes physical connections to leaf nodes. In the example shown in FIG. 4, one virtual CE router includes physical connections to leaf nodes L1 and L2. This is illustrated by the physical connection between leaf L1 with address 15.1.1.1 terminating at the virtual CE router with address 15.1.1.2. This is further illustrated by the physical connection between leaf L2 with address 14.1.1.1 terminating at the virtual CE router with address 14.1.1.2. This is further illustrated by the physical connection between leaf L3 with address 15.1.1.1 terminating at the virtual CE router with address 15.1.1.2. This is further illustrated by the physical connection between leaf L4 with address 14.1.1.1 terminating at the virtual CE router with address 14.1.1.2.

The architecture illustrated in FIGS. 4-10 enables numerous benefits over the architectures known in the prior art, including those illustrated in FIGS. 2 and 3. Traditionally, layer-2 links are created between a server and the leaf nodes. This layer-2 link causes numerous problems in the architectures known in the prior art. The architecture illustrated in FIGS. 4-10 moves the L2-L3 boundary to the virtual CE router and eliminates many of the issues known to exist with the architectures illustrated in FIGS. 2 and 3. For example, having the virtual CE router and the virtual machines on the same server box localizes functionality and eliminates the layer-2 link from the server to the leaf node as known in the prior art. The architecture shown in FIGS. 4-10 introduces layer-3 router links from the bare metal server to each of the plurality of leaf nodes. This simplifies leaf node functionality such that the same functionality is achieved without layer-2 termination on each of the leaf nodes.

The architecture 400 includes spine nodes S1 and S2 in communication with leaf nodes L1, L2, L3, and L4. The address for leaf node L1 is 15.1.1.1, the address for leaf node L2 is 14.1.1.1, the address for leaf node L3 is 15.1.1.1, and the address for leaf node L4 is 14.1.1.1. The nodes L1 and L2 are in communication with a virtual customer edge (CE) router. The virtual CE router is located on a bare metal server along with the virtual machines. The nodes L3 and L4 are in communication with a virtual customer edge (CE) router. The L2-L3 boundary exists at the virtual CE router level. The virtual CE routers are in communication with multiple virtual machines, including VM-a, VM-b, VM-c, VM-d, VM-e, VM-f, VM-g, and VM-h as illustrated.

Host virtual machine IP-MAC bindings are traditionally learnt on the first hop gateway via ARP. However, in a stretched subnet scenario, ARP-based learning results in a need to flood ARP requests across the overlay to bootstrap host learning at the local virtual CE router. This requires a layer-2 overlay flood domain. To avoid a layer-2 overlay across the leaf nodes and reliance on ARP-based host learning, the host virtual machine IP and MAC binding configured on the virtual machine external interface and must be passively learnt by L3DL on the server via them being exposed to the hypervisor. This ensures that directly connected host virtual machine bindings are always known upfront. This further avoids any need for glean processing and flooding. Local VM IP host routes (overlay host routes) are relayed from hypervisor to the leaf nodes by way of L3DL.

The architecture 400 introduces a small virtual CE router on the server that terminates layer-2 from the host. The virtual CE router provides TRB service for local host virtual machines. The virtual CE router routes all traffic to external host virtual machines via ECMP layer-3 links to leaf nodes via the default route. The virtual CE routers learn host virtual machine interface IP addresses and MAC addresses at host boot-up. Local VM IP host routes (overlay host routes) are relayed from the hypervisor to the leaf nodes by way of L3DL. The leaf nodes advertise local host routes to remote leaf nodes via Border Gateway Protocol (BGP).

In an embodiment, subnet stretch is enabled via host routing of both intra-subnet and inter-subnet flows at the leaf node. The virtual CE router is configured as a proxy ARP to host route intra-subnet flows via leaf node. The virtual CE router may be configured with the same anycast gateway IP addresses and MAC addresses everywhere. The architecture 400 provides EVPN host mobility procedures applied at the leaf nodes. The architecture 400 enables flexible workload placement and virtual machine mobility across the stretched subnet.

In the architecture 400, end to end host routing is setup at boot-up. Both inter-subnet and intra-subnet traffic flows across stretched subnets enabled via end-to-end host routing. There is no reliance on indeterministic data plane and ARP-based learning.

The architecture 400 provides local host learning via L3DL to the virtual customer edge (virtual CE router) router. The EVPN host routing is performed across the overlay. The EVPN has layer-3 host mobility and layer-3 mass withdraw. The architecture 400 provides private subnet that is never redistributed into Border Gateway Protocol (BGP). In the architecture 400, first hop anycast gateway provides a local IRB service.

The virtual CE routers may be configured as an ARP proxy for all directly connected host virtual machines to that inter-subnet and intra-subnet traffic flows can be routed. The virtual CE routers may be configured with default route pointing to a set of upstream leaf nodes to which the virtual CE router is multi-homed to. The virtual CE routers may be configured with the same anycast gateway MAC on all bare metal servers to enable host virtual machine mobility across the DC fabric. The virtual CE routers may not redistribute server-facing connected subnets into DC side routing protocol to avoid IP addressing overhead on server links. The virtual CE routers may reside in the hypervisor that is provisioned as the default gateway for the host virtual machines in a VLAN. The virtual CE routers may be separate router virtual machines such that the router virtual machine is provisioned as the default gateway for the host virtual machines in a VLAN.

In an embodiment, the leaf nodes must advertise host routes learnt from locally connected virtual CE routers as EVPN RT-5 across the EVPN overlay. The EVPN mobility procedure may be extended to EVPN RT-5 to achieve host virtual machine mobility. The EVPN mass withdraw procedures may be extended to EVPN RT-5 for faster convergence.

The embodiments discussed herein eliminate the need for overlay bridging functions to be supported on the leaf nodes. Additionally, the embodiments discussed herein eliminate the need for layer-2 MLAG connectivity and related complex procedures between the leaf nodes and hosts. Further, the embodiments discussed herein eliminate the need for data plane and ARP-based host learning on the leaf nodes. These benefits are enabled by the embodiments disclosed herein while providing IP unicast inter-subnet and intra-subnet VPN connectivity, virtual machine mobility, and flexible workload placement across stretched IP subnets.

The embodiments of the disclosure separate local layer-2 switching and IRB functions from the leaf node and localize them into a small virtual CE router on the bar metal server. This is achieved by running a small virtual router VM on the bare metal server that now acts as the first hop gateway for host virtual machines and provides local IRB switching across virtual machines local to the bare metal server. This virtual router acts as a traditional CE router that may be multi-homed to multiple leaf nodes via a layer-3 routed interface on the leaf node. leaf nodes in the fabric function as pure layer-3 VPN PE routers that are free of any layer-2 bridging or IRB function. To allow for flexible placement and mobility of layer-3 endpoints across the DC overlay, while providing optimal routing, traffic can be host routed on the leaf nodes versus being subnet routed. This is the case with EVPN-IRB.

Figure 5:
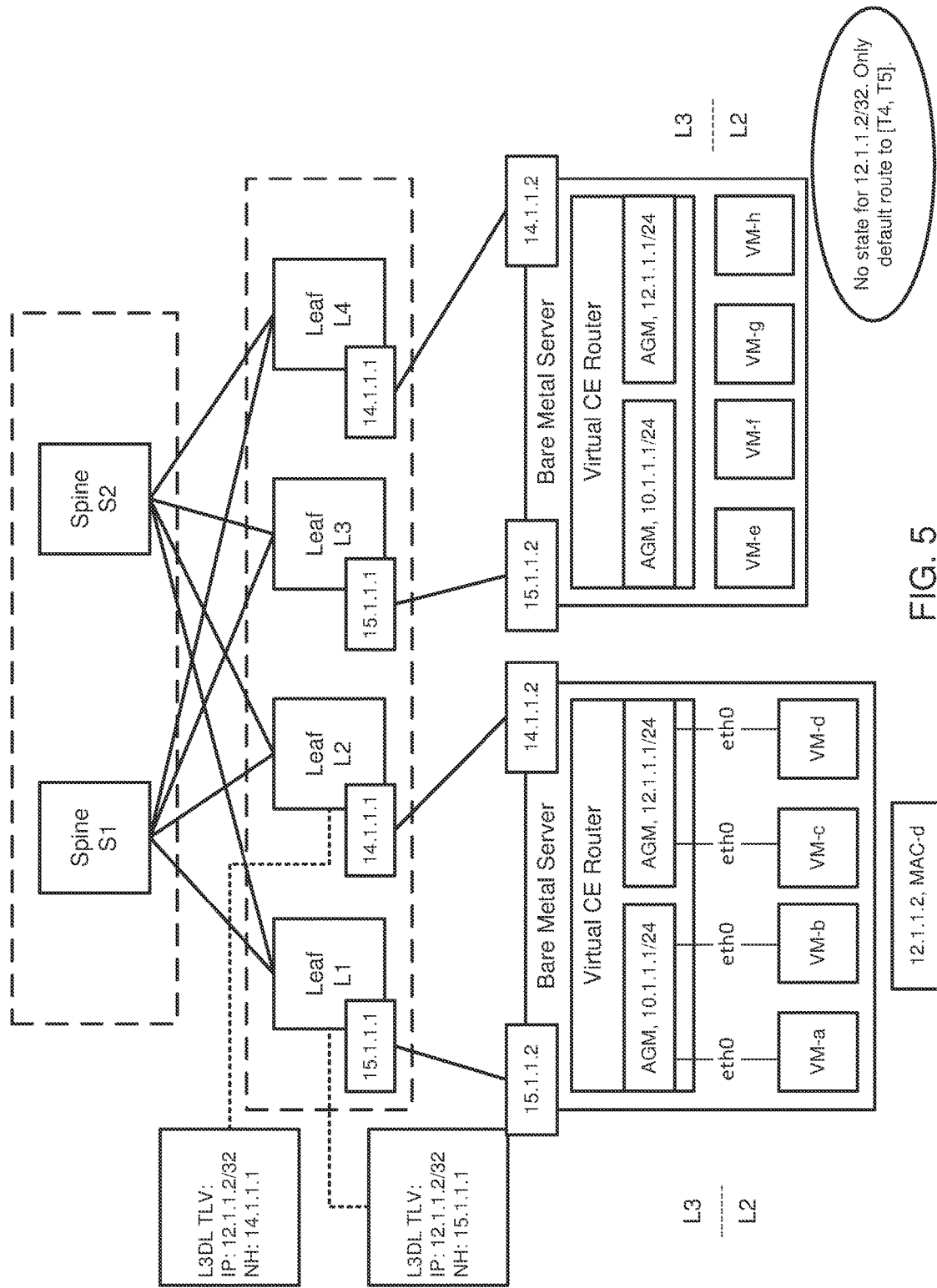
FIG. 5 is a schematic diagram of a datacenter fabric architecture with overlay routing at the L2-L3 boundary pushed to a virtual customer edge (CE) router gateway on a bare metal server illustrating host learning at boot up.

FIG. 5 is a schematic diagram of the architecture 400 illustrating host learning at boot up. The host virtual machine routes learnt via L3DL are installed in the FIB and point to the virtual CE router as the next hop. In the absence of multi-tenancy (no VPNs), host virtual machine routes are advertised via BGP global routing to remote leaf nodes. In the case of multiple tenancy, host virtual machine routes are advertised to remote leaf nodes via BGP-EVPN RT-5 with a VPN encapsulation such as VXLAN or MPLS. As such, any other routing protocol may also be deployed as an overlay routing protocol.

In an embodiment, subnet extension across the overlay is enabled via routing intra-subnet traffic at the virtual CE router and then at the leaf node. In order to terminate layer-2 at the virtual CE router, the virtual CE router must be configured as an ARP proxy for host virtual machine subnets such that both intra-subnet and inter-subnet traffic can be routed at the virtual CE router and then at the leaf node.

In an embodiment, the IP subnet used for layer-3 links to the server must be locally scoped to avoid IP addressing overhead. In other words, server facing connected subnets should not be redistributed into northbound routing protocol.

In an embodiment, to achieve multiple tenancy, overlay layer-3 VLAN/TRB interface on the virtual CE router first hop gateway must be attached to a tenant VRF. Further, routed VXLAN/VNI encapsulation is used between the virtual CE router and the leaf node to segregate multiple tenant traffic. In addition, for L3DL overlay host routes sent to the leaf node to be installed in the correct VPN/VRF table on the leaf node, the L3DL overlay hosts must also include the layer-3 VNI ID. This VNI ID is then used at the leaf node to identify and install the route in the correct VRF.

Figure 6:
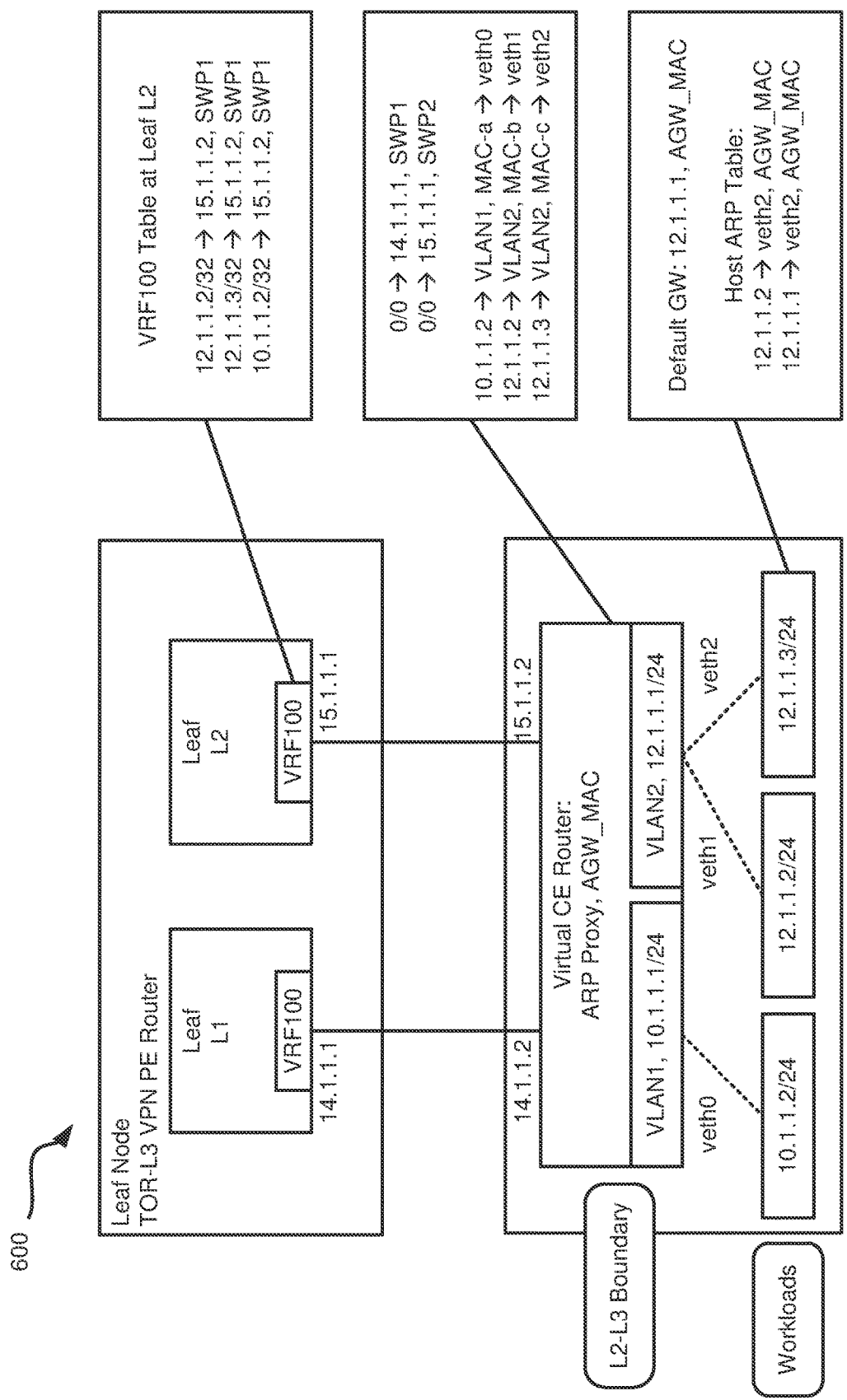
FIG. 6 is a schematic diagram of a datacenter fabric architecture with overlay routing at the L2-L3 boundary pushed to a virtual customer edge (CE) router gateway on a bare metal server illustrating the local forwarding state.

FIG. 6 illustrates a protocol 600 for a PE distributed anycast router. FIG. 6 further illustrates the forwarding tables for the leaf nodes L1 and L2. In the protocol 600, the host virtual machine routes learnt via L3DL are installed in the FIB pointing to the virtual CE router next hop in a resulting FIB state. In the absence of multiple tenancy (no VPNs), host virtual machine routes are advertised via BGP global routing to remote distributed anycast routers. In the case of multiple tenancy, host virtual machine routes are advertised to remote distributed anycast routers via BGP-EVPN RT-5 with a VPN encapsulation such as VXLAN or MPLS.

Figure 7:
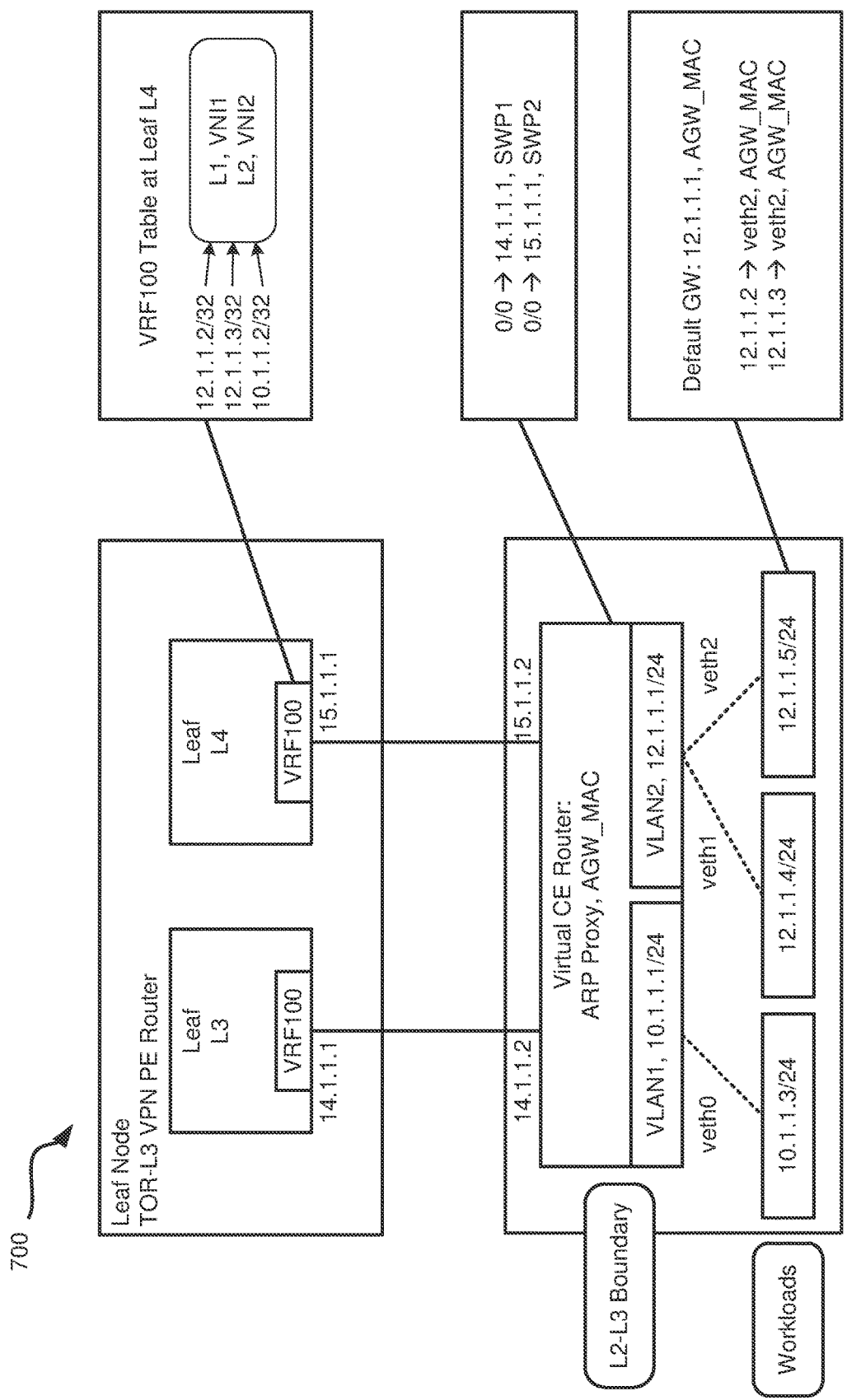
FIG. 7 is a schematic diagram of a datacenter fabric architecture with overlay routing at the L2-L3 boundary pushed to a virtual customer edge (CE) router gateway on a bare metal server illustrating the remote forwarding state.

FIG. 7 is a schematic diagram of a protocol 700 for a virtual CE router as an ARP proxy. In the protocol 700, subnet extension across the overlay is enabled via routing intra-subnet traffic at the virtual CE router and then at the leaf node. In order to terminate layer-2 at the hypervisor virtual CE router, the virtual CE router must be configured as an ARP proxy for host virtual machine subnets such that both intra-subnet and inter-subnet traffic can be routed at the virtual CE router and then at the distributed anycast router.

Figure 8A:
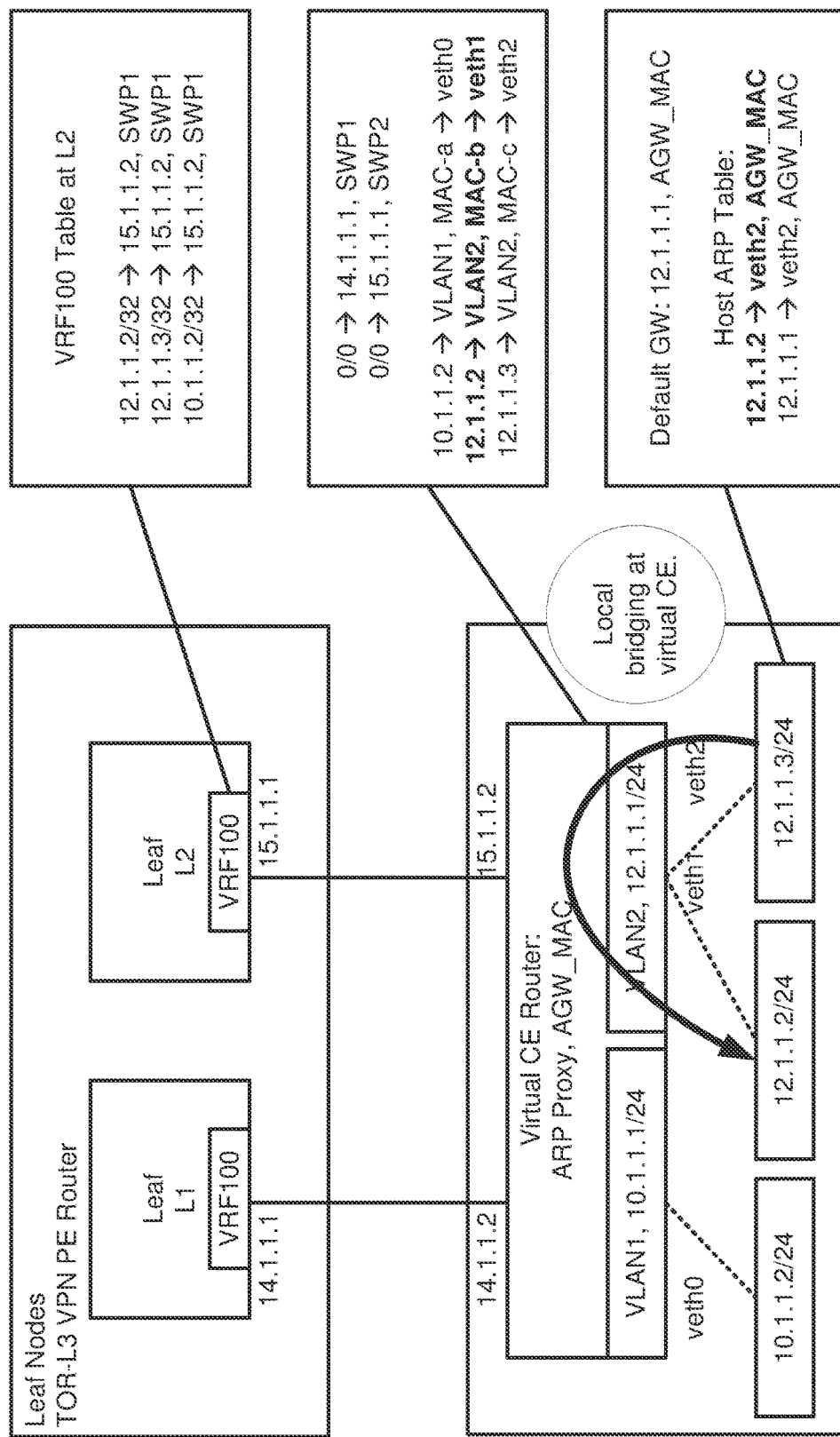
FIG. 8A is a schematic diagram of a datacenter fabric architecture with overlay routing at the L2-L3 boundary pushed to a virtual customer edge (CE) router gateway on a bare metal server illustrating the intra-subnet server local flow.
Figure 8B:
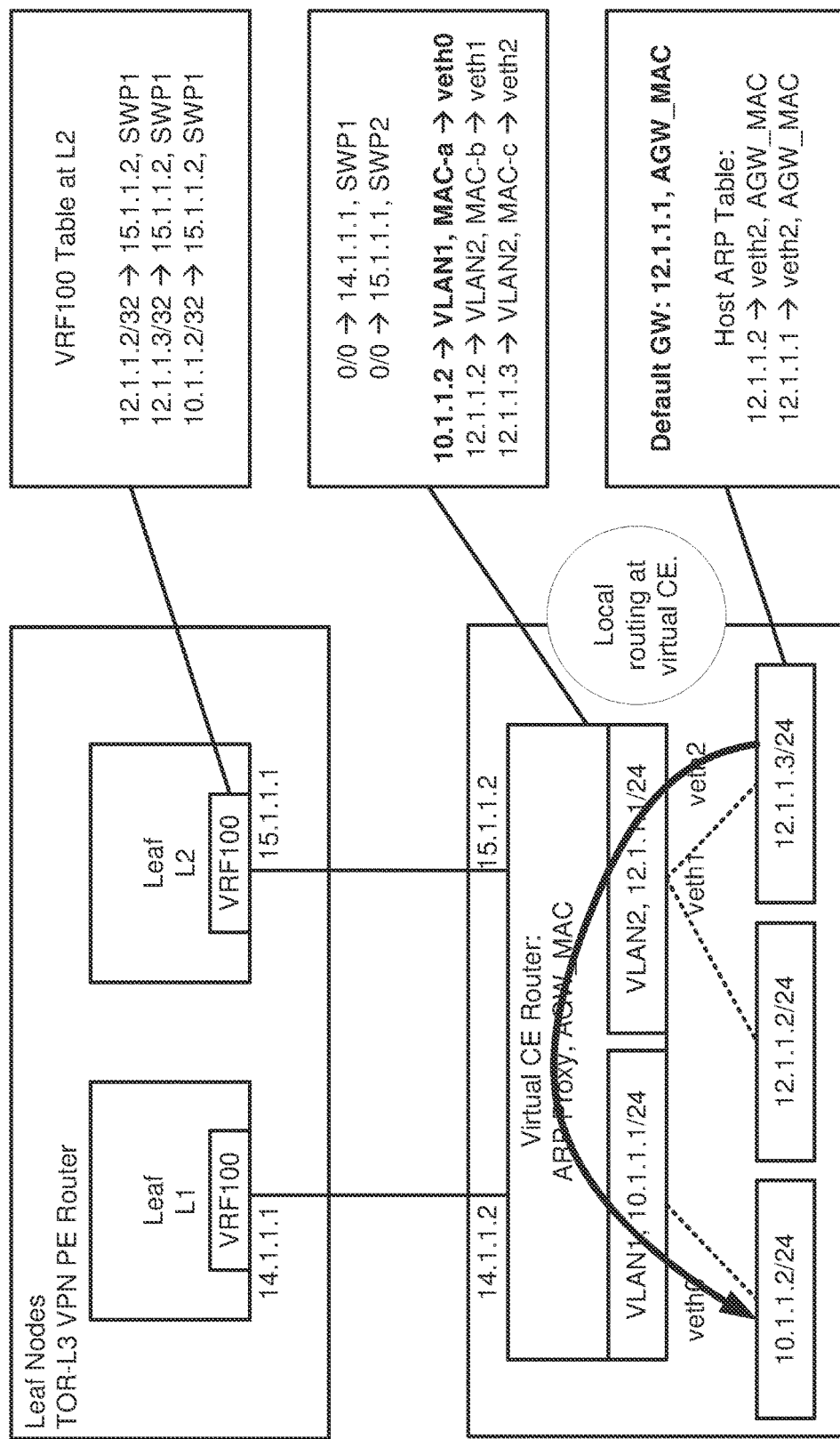
FIG. 8B is a schematic diagram of a datacenter fabric architecture with overlay routing at the L2-L3 boundary pushed to a virtual customer edge (CE) router gateway on a bare metal server illustrating the inter-subnet server local flow.

FIGS. 8A and 8B illustrate protocols for server local flow. FIG. 8A illustrates a protocol for intra-subnet flow and FIG. 8B illustrates a protocol for inter-subnet flow. The virtual CE router is configured with default route pointing to a set of upstream leaf nodes that it is multi-homed toward.

In the protocol illustrated in FIG. 8A, a host to host flows local to a bare metal server protocol, once virtual CE router has learnt all host VM adjacencies and is configured as an ARP proxy, both inter and intra subnet flows across host VMs local to the bare metal server are layer 2 terminated at the virtual CE router and routed to the local destination host VM. In FIG. 8A, the default gateway (GW) for transmitting an object to 12.1.1.1 through the anycast gateway (AGW) is through 12.1.1.2→veth2, anycast gateway media access control (AGW_MAC).

In the inter-subnet flow protocol illustrated in FIG. 8B, a host to host flows local to a bare metal server protocol, once virtual CE router has learnt all host VM adjacencies and is configured as an ARP proxy, both inter and intra subnet flows across host VMs local to the bare metal server are layer 2 terminated at the virtual CE router and routed to the local destination host VM.

Figure 9A:
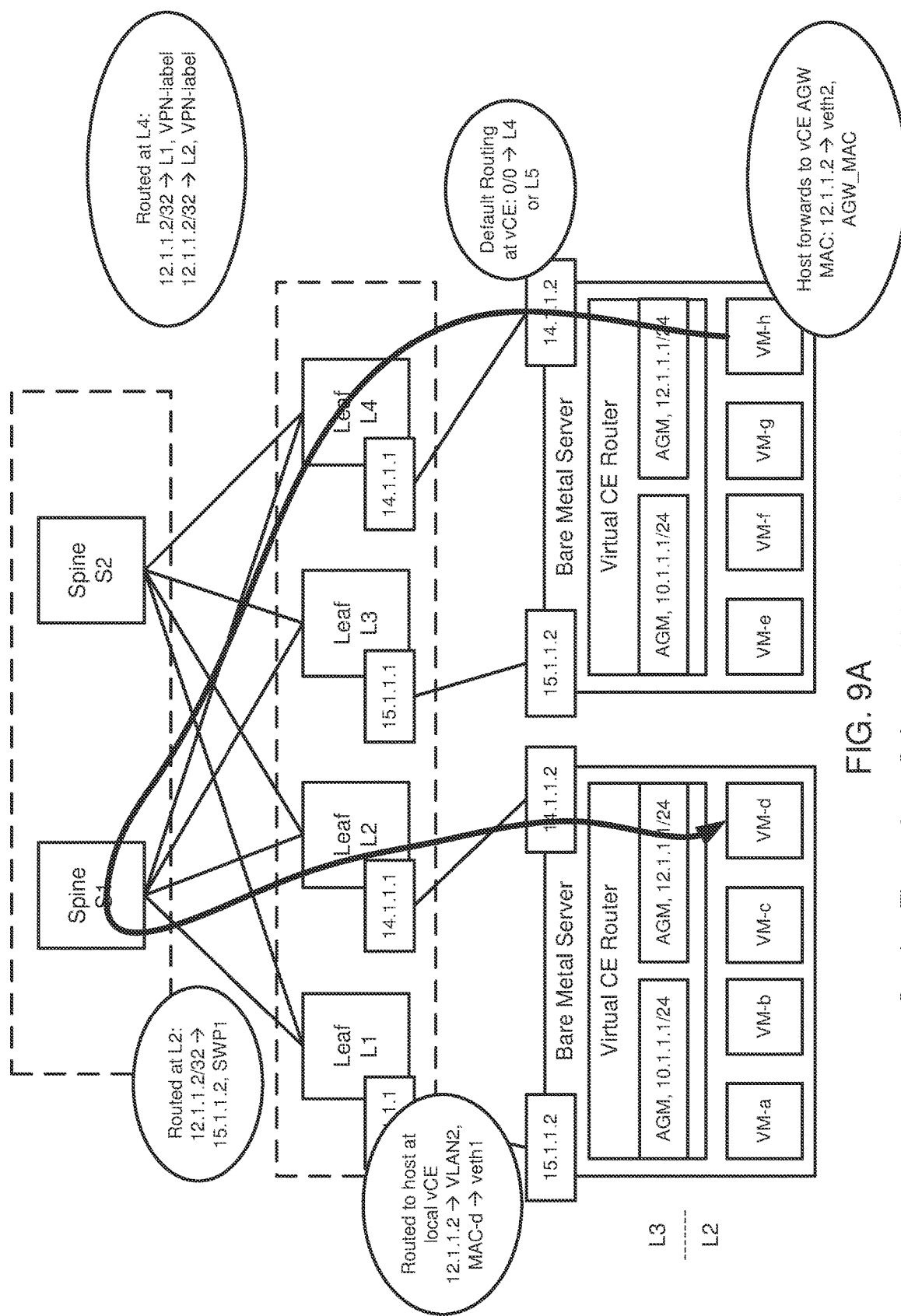
FIG. 9A is a schematic diagram of a datacenter fabric architecture with overlay routing at the L2-L3 boundary pushed to a virtual customer edge (CE) router gateway on a bare metal server illustrating the intra-subnet overlay flow form address 12.1.1.4 to address 12.1.1.2.
Figure 9B:
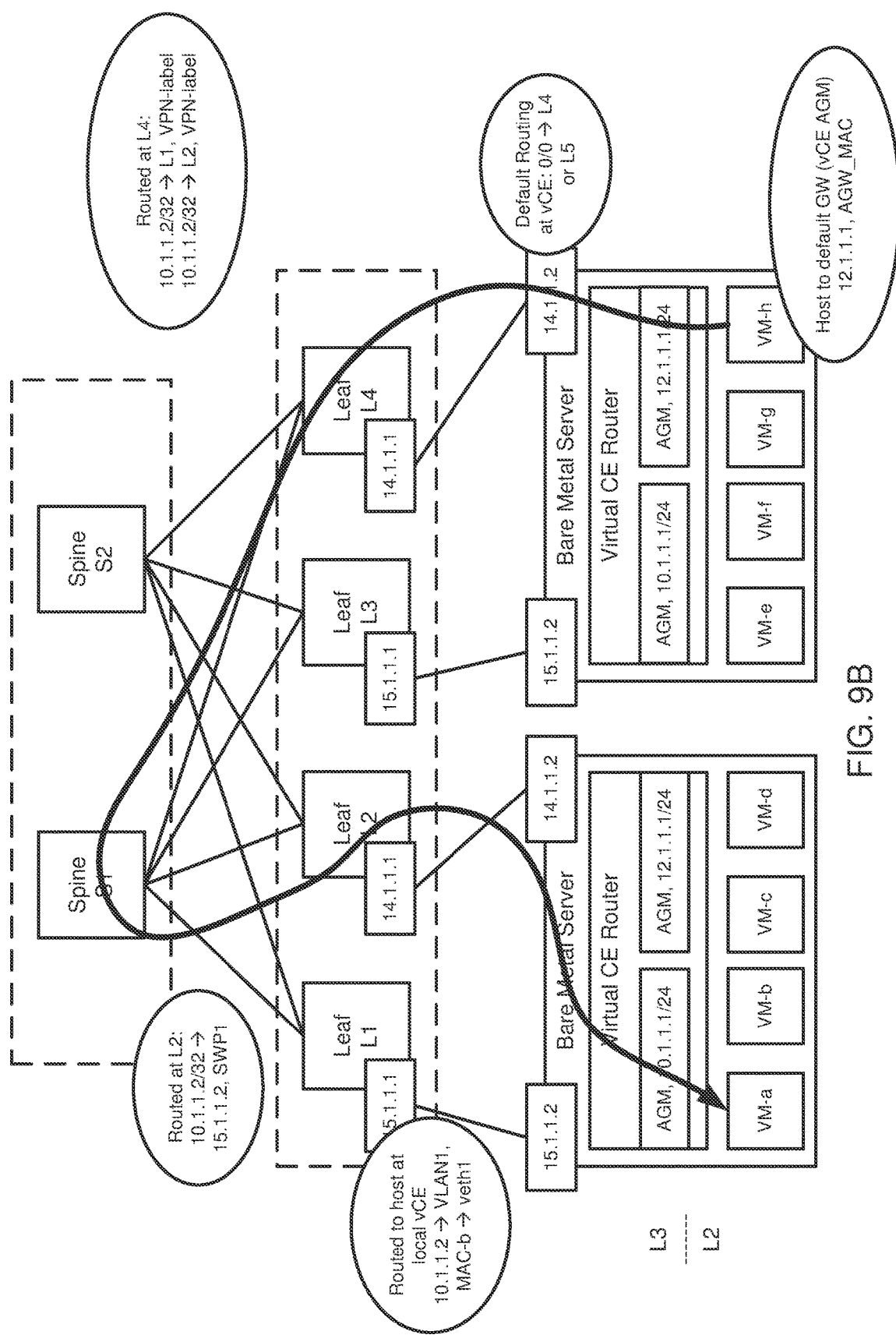
FIG. 9B is a schematic diagram of a datacenter fabric architecture with overlay routing at the L2-L3 boundary pushed to a virtual customer edge (CE) router gateway on a bare metal server illustrating the inter-subnet overlay flow from address 12.1.1.4 to address 10.1.1.2.

FIGS. 9A and 9B illustrated protocols for overlay flow. FIG. 9A illustrates a protocol for intra-subnet overlay flow from 12.1.1.4 to 12.1.1.2. FIG. 9B illustrates a protocol for inter-subnet overlay flow from 12.1.1.4 to 10.1.1.2.

In the protocol illustrated in FIG. 9B, a host to host overlay inter-subnet flow across the leaf nodes. In this protocol, virtual CE router is configured with default route pointing to a set of upstream distributed anycast routers that it is multi-homed to. All out-bound inter-subnet and intra-subnet traffic from host VMs is now routed by this virtual CE across L3 ECMP links to upstream leaf nodes instead of being hashed across a layer-2 LAG, as shown in FIGS. 9A and 9B. leaf nodes act as pure layer-3 routers that are completely free of any layer-2 bridging or IRB function. East-west flows across servers connected to the same leaf node are routed locally by the leaf node to destination virtual CE next-hop.

A protocol, shown in FIGS. 9A and 9B may include host to host overlay flows across leaf nodes. In this protocol, east-west flows (both inter and intra-subnet) across servers connected to different distributed anycast routers are routed from virtual CE router to the local leaf nodes via default route, and then routed at the leaf node across the routed overlay to the destination/next-hop leaf node based on host routes learnt via EVPN RT-5. Leaf node to leaf node routing may be based on a summarized or subnet route instead of host routes only if the subnet is not stretched across the overlay. North-south flows (to destinations external to the DC) may be routed via a per-VRF default route on the leaf nodes towards the border leaf/DCI GW.

Figure 10:
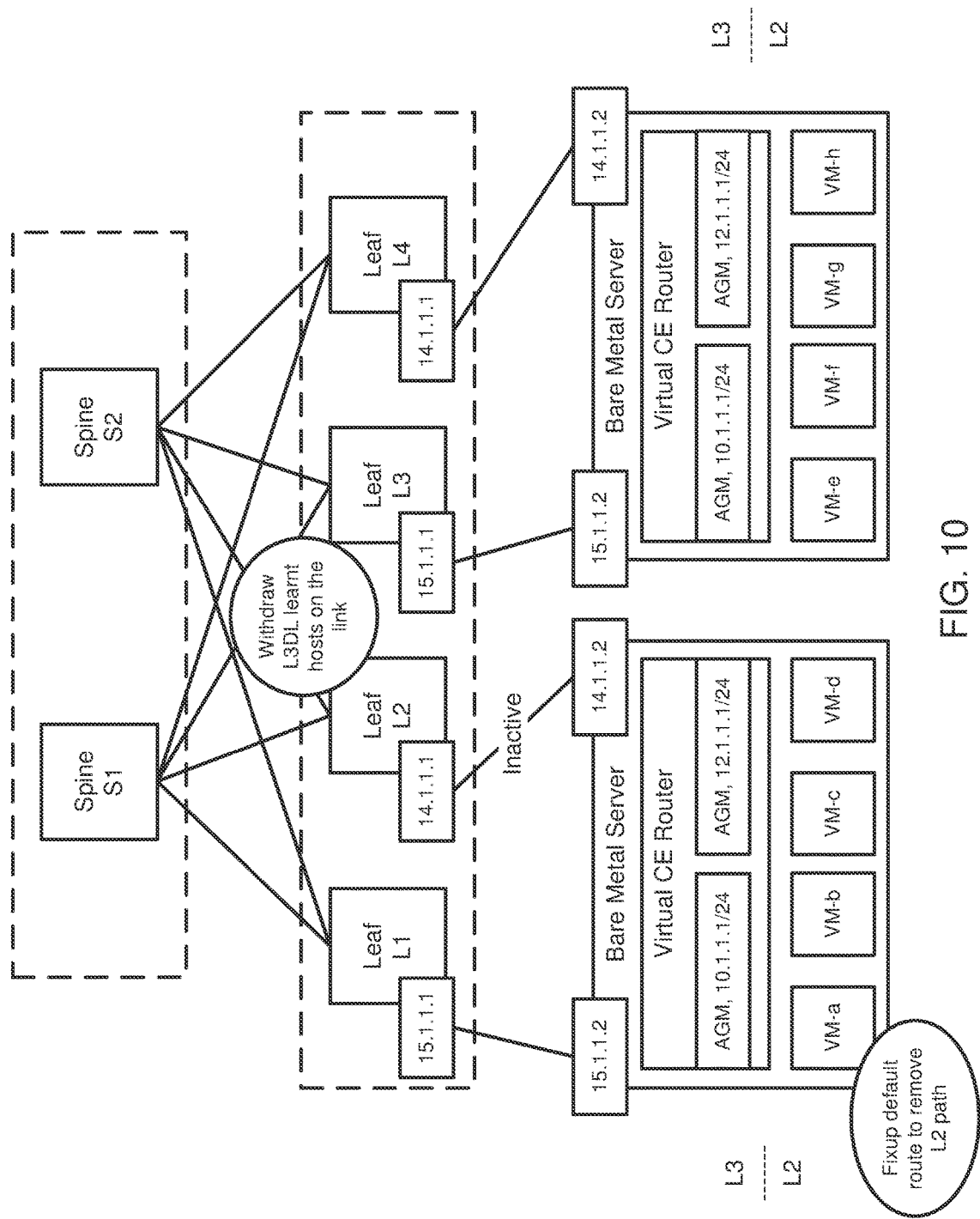
FIG. 10 is a schematic diagram of a datacenter fabric architecture with overlay routing at the L2-L3 boundary pushed to a virtual customer edge (CE) router gateway on a bare metal server illustrating a server link failure.

Another protocol, illustrated in FIG. 10, identifies a leaf node server link failure. This protocol may be employed as an alternative redundancy mechanism. A routed backup link is configured between the leaf nodes and pre-programmed as a backup failure path for overlay host routes facing the server. The backup path is activated on the leaf node server link failure in a prefix independent manner for a given VRF that is associated with the same VLAN (VNI) encapsulation.

In the protocol illustrated in FIG. 10, outbound traffic from host VMs would converge as a result of virtual CE router removing the failed path from default route ECMP path-set, following link failure. Inbound traffic from the DC overlay would convergence as a result of L3DL learnt host routes being deleted and withdrawn from the affected leaf node. This convergence, however, would be host route scale dependent. EVPN mass withdraw mechanism would need to be extended to IP host routes in order to achieve prefix independent convergence. An ESI construct is associated with the set of layer-3 from distributed anycast routers within a redundancy group. Local ESI reachability is advertised via per-ESI EAD RT-1 to remote distributed anycast routers. A forwarding indirection, as shown in FIG. 10, is established at the remote distributed anycast routers via this route to enable fast convergence on single RT-1 withdraw from the local distributed anycast router, following ESI failure.

The protocols illustrated in FIG. 10 may be implemented in the event of a server link failure. Outbound traffic from host virtual machines may converge as a result of a virtual CE router removing the failed path from default route ECMP path-set, following link failure. Inbound traffic from the DC overlay would convergence as a result of L3DL learnt host routes being deleted and withdrawn from the affected leaf node. This convergence, however, would be host route scale dependent. EVPN mass withdraw mechanism would need to be extended to IP host routes in order to achieve prefix independent convergence. An ESI construct is associated with the set of layer-3 links from leaf nodes within a redundancy group. Local ESI reachability is advertised via per-ESI EAD RT-1 to remote leaf nodes. A forwarding indirection is established at the remote leaf nodes via this route to enable fast convergence on single RT-1 withdraw from the local leaf node, following ESI failure.

All outbound inter-subnet and intra-subnet traffic from host virtual machines is now routed by this virtual CE router across layer-3 ECMP links to upstream leaf nodes instead of being hashed across a layer-2 LAG. leaf nodes act as pure layer-3 routers that are completely free of any layer-2 bridging or TRB function. East-West flows across servers connected to the same leaf node are routed locally by the leaf node to destination virtual CE router next hop.

East-West flows (both inter-subnet and intra-subnet) across servers connected to different leaf nodes are routed from virtual CE routers to the local leaf nodes via default route, and then routed at the leaf node across the routed overlay to the destination. The next hop leaf node is based on host routes learnt via EVPN RT-5. The leaf node to leaf node routing may be based on a summarized or subnet route instead of host routes only if the subnet is not stretched across the overlay.

North-South flows to destinations external to the DC may be routed via a per-VRF default route on the leaf nodes toward the border leaf.

Another protocol provides a simplicity and scaling embodiment. In this embodiment, in response to a first-hop GW localized on the virtual CE, leaf nodes no longer install any host MAC routes, saving forwarding resources on the distributed anycast router. Further, with default routing on the leaf nodes, virtual CEs only maintain adjacencies to host VMs local to each bare metal server. All bridging and MLAG functions are completely removed from the leaf nodes, resulting in operational simplicity and greater reliability. Using deterministic protocol-based host route learning between the virtual CE and distributed anycast router, EVPN aliasing procedures are no longer required on the distributed anycast router and with deterministic protocol-based host route learning between the virtual CE and leaf node, ARP flooding is never required across the overlay. Further, using a deterministic protocol-based host route learning between the virtual CE and distributed anycast router, unknown unicast flooding is never required. Finally, with layer-3 ECMP links between the virtual CE and leaf nodes, EVPN DF election, and split horizon filtering procedures are no longer required.

Figure 11:
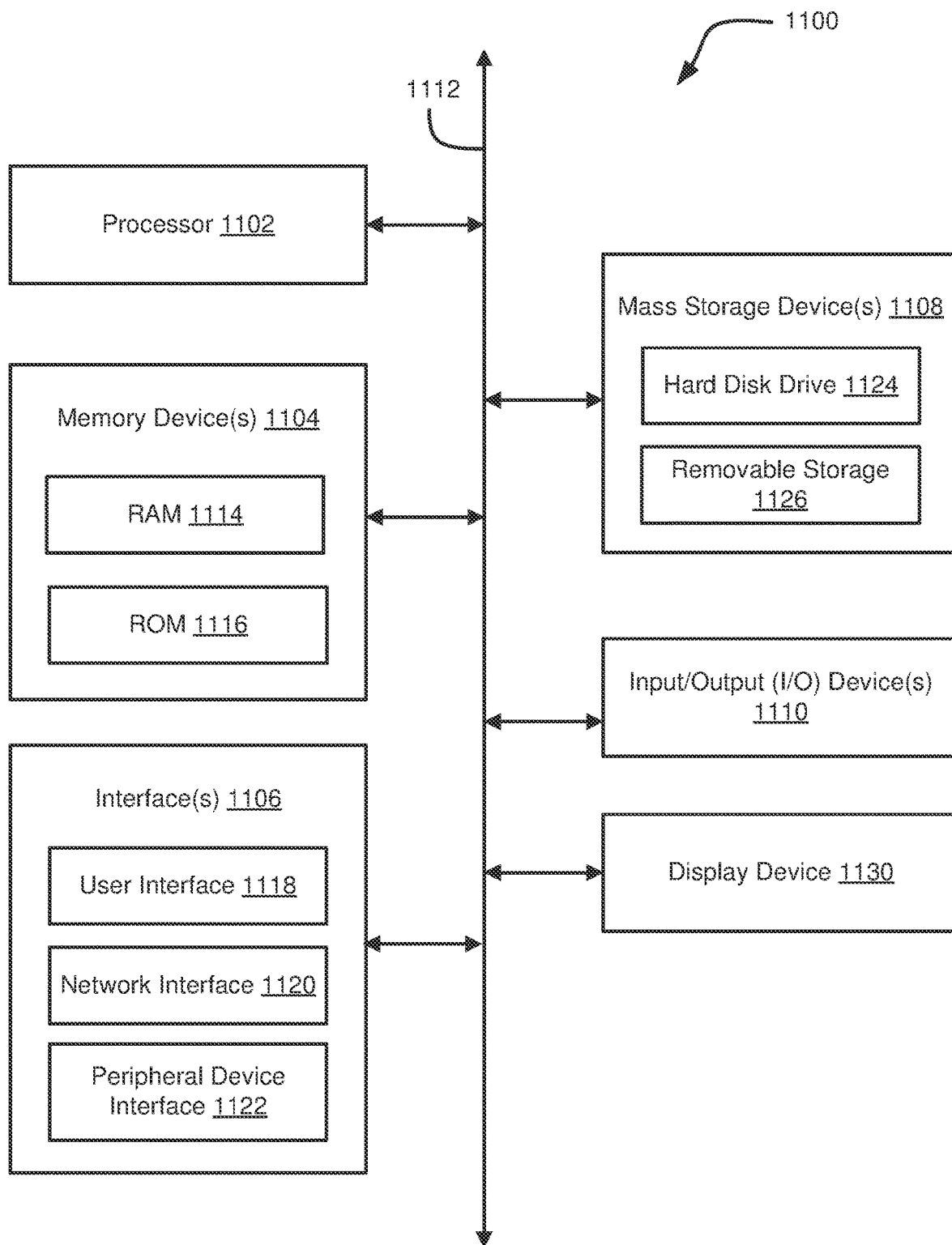
FIG. 11 is a schematic diagram illustrating components of an example computing device.

Referring now to FIG. 11, a block diagram of an example computing device 1100 is illustrated. Computing device 1100 may be used to perform various procedures, such as those discussed herein. In one embodiment, the computing device 1100 can function to perform the functions of the asynchronous object manager and can execute one or more application programs. Computing device 1100 can be any of a wide variety of computing devices, such as a desktop computer, in-dash computer, vehicle control system, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/output (I/O) device(s) 1102, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

Input/output (I/O) device(s) 1102 include various devices that allow data and/or other information to be input to or retrieved from computing device 1100. Example I/O device(s) 1102 include cursor control devices, keyboards, keypads, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1102, memory device(s) 1104, interface(s) 1106, mass storage device(s) 1108, and I/O device(s) 1102 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1100 and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

EXAMPLES

The following examples pertain to further embodiments.

Example 1 is a system. The system includes a virtual customer edge router one a server and a host routed overlay comprising a plurality of host virtual machines. The system includes a routed uplink from the virtual customer edge router to one or more of a plurality of leaf nodes. The system is such that the virtual customer edge router is configured to provide localized integrated routing and bridging (IRB) service for the plurality of host virtual machines of the host routed overlay.

Example 2 is a system as in Example 1, wherein the host routed overlay is an Ethernet virtual private network (EVPN) host.

Example 3 is a system as in any of Examples 1-2, wherein the host routed overlay comprises EVPN layer-3 mobility.

Example 4 is a system as in any of Examples 1-3, wherein the virtual customer edge router is a first hop anycast gateway for one or more of the plurality of leaf nodes.

Example 5 is a system as in any of Examples 1-4, wherein the virtual customer edge router routes traffic to external leaf nodes via equal-cost multipath (ECMP) routing links to leaf nodes.

Example 6 is a system as in any of Examples 1-5, wherein the virtual customer edge router is configured as a proxy address resolution protocol (ARP) to host route intra-subnet flows in the host routed overlay.

Example 7 is a system as in any of Examples 1-6, wherein the routed uplink from the virtual customer edge router to one or more of the plurality of leaf nodes is a layer-3 interface.

Example 8 is a system as in any of Examples 1-7, wherein the virtual customer edge router stores addresses locally and does not redistribute the addresses in Border Gateway Protocol (BGP) routing.

Example 9 is a system as in any of Examples 1-8, wherein the virtual customer edge router comprises memory storing one or more of: local Internet Protocol (IP) entries for the host routed overlay, media access control (MAC) entries for the host routed overlay, or a default ECMP route to the host routed overlay.

Example 10 is a system as in any of Examples 1-9, wherein the host routed overlay is configured to perform host routed for stretched subnets.

Example 11 is a system as in any of Examples 1-10, wherein the virtual customer edge router is located on a single tenant physical server.

Example 12 is a system as in any of Examples 1-11, wherein the virtual customer edge router is a virtual router virtual machine running on a single tenant physical server and is configured to act as a first hop gateway for one or more of the plurality of leaf nodes.

Example 13 is a system as in any of Examples 1-12, wherein the plurality of host virtual machines are located on the single tenant physical server.

Example 14 is a system as in any of Examples 1-13, wherein the virtual customer edge router is multi-homed to multiple distributed anycast routers via a layer-3 routed interface on a distributed anycast router.

Example 15 is a system as in any of Examples 1-14, wherein the virtual customer edge router is configured to learn local host virtual machine routes without dependency on glean processing and ARP-based learning.

Example 16 is a system as in any of Examples 1-15, wherein the virtual customer edge router is further configured to advertise local host virtual machine routes to a directly connected distributed anycast router.

Example 17 is a system as in any of Examples 1-16, wherein the virtual customer edge router is configured to learn IP bindings and MAC bindings for one or more of the plurality of host virtual machines via link state over ethernet (LSoE).

Example 18 is a system as in any of Examples 1-17, wherein the virtual customer edge router comprises memory and is configured to store in the memory adjacencies for one or more of the host virtual machines that are local to a same bare metal server on which the virtual customer edge router is located.

Example 19 is a system as in any of Examples 1-18, further comprising a distributed anycast router, and wherein the virtual customer edge router is configured to enact deterministic protocol-based host route learning between the virtual customer edge router and the distributed anycast router.

Example 20 is a system as in any of Examples 1-19, wherein the routed uplink from the virtual customer edge router to the one or more of the plurality of host machines is a layer-3 equal-cost multipath (ECMP) routing link.

Example 21 is a system as in any of Examples 1-20, wherein one or more of the plurality of leaf nodes comprises a virtual private network-virtual routing and forwarding (VPI-VRF) table.

Example 22 is a system as in any of Examples 1-21, wherein the one or more of the plurality of leaf nodes further comprises a layer-3 virtual network identifier (VNI) used at the one or more of the plurality of leaf nodes to install a route in a correct virtual routing and forwarding table.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
   a plurality of bare metal servers each comprising a virtual customer edge router and a host virtual machine;
   a host routed overlay comprising at least one host virtual machine;
   a routed uplink from at least one virtual customer edge router to one or more of a plurality of leaf nodes in a network topology; and
   a distributed anycast router, wherein the at least one virtual customer edge router is configured to enact host route learning between the at least one virtual customer edge router and the distributed anycast router;
   wherein the at least one virtual customer edge router provides localized integrated routing and bridging (RB) for the at least one host virtual machine; and
   wherein a plurality of virtual customer edge routers corresponding with the plurality of bare metal servers are configured with the same anycast gateway media access control (MAC) to enable host virtual machine mobility across the host routed overlay.

2. The system of claim 1, wherein the plurality of virtual customer edge routers is each in communication with the host virtual machine on the same bare metal server, and wherein the plurality of virtual customer edge routers each comprises memory for storing adjacencies for the host virtual machine on the same bare metal server.

3. The system of claim 1, wherein each of the plurality of virtual customer edge routers comprises memory for storing one or more of: local Internet Protocol (IP) entries for the host routed overlay, media access control (MAC) entries for the host routed overlay, or a default ECMP route to the host routed overlay.

4. The system of claim 1, wherein the host routed overlay performs host routing for stretched subnets.

5. The system of claim 1, wherein the host routed overlay is an Ethernet virtual private network (EVPN) host.

6. The system of claim 1, wherein at least a portion of the plurality of virtual customer edge routers is a first hop gateway for one or more of the plurality of leaf nodes.

7. The system of claim 1, wherein at least a portion of the plurality of virtual customer edge routers routes traffic to external leaf nodes via equal-cost multipath (ECMP) routing links.

8. The system of claim 1, wherein at least a portion of the plurality of virtual customer edge routers is configured as a proxy address resolution protocol (ARP) to host route intra-subnet flows within a host routed overlay.

9. The system of claim 1, wherein the routed uplink comprises a layer-3 routed uplink with a layer-3 interface.

10. The system of claim 1, wherein at least a portion of the plurality of virtual customer edge routers stores addresses locally and does not redistribute the addresses in Border Gateway Protocol (BGP) routing.

11. The system of claim 1, wherein at least a portion of the plurality of bare metal servers is a single-tenant physical server, and wherein a first instance of the virtual customer edge router and a first host virtual machine are located on the same single-tenant physical server.

12. The system of claim 1, wherein at least a portion of the plurality of virtual customer edge routers comprises a dedicated communication line on each leaf node of the plurality of leaf nodes in the network topology.

13. The system of claim 1, wherein at least a portion of the plurality of virtual customer edge routers is configured as an Address Resolution Protocol (ARP) proxy for host virtual machine subnets such that intra-subnet and inter-subnet traffic is routed at one or more of the plurality of virtual customer edge routers and the distributed anycast router.

14. The system of claim 1, wherein the routed uplink is a layer-3 equal-cost multipath (ECMP) routing link.

15. The system of claim 1, wherein one or more of the plurality of leaf nodes in the network topology comprises a virtual private network-virtual routing and forwarding (VPN-VRF) table.

16. The system of claim 1, wherein one or more of the plurality of leaf nodes comprises a layer-3 virtual network identifier (VNI) used at the one or more of the plurality of leaf nodes to install a route in a correct virtual routing and forwarding table.

17. The system of claim 1, wherein at least a portion of the plurality of virtual customer edge routers advertises local host virtual machine routes to the distributed anycast router, and wherein the distributed anycast router is directly connected to the advertising virtual customer edge router.

18. The system of claim 1, wherein each of the plurality of virtual customer edge routers distributed across the plurality of bare metal servers is configured to enact deterministic protocol-based host route learning.

* * * * *